United States Patent [19]

Shinryo et al.

[11] 3,727,162

[45] Apr. 10, 1973

[54] POWER SUPPLY ARRANGEMENT

[75] Inventors: Yuko Shinryo; Hideyuki Tsuruno, Nagasaki, Nagasaki Prefecture, both of , Japan

[73] Assignee: Mitsubishi Denki Kabushiki Kaisha, Tokyo, Japan

[22] Filed: June 5, 1972

[21] Appl. No.: 259,816

[30] Foreign Application Priority Data

June 10, 1971 Japan..........................46/41281

[52] U.S. Cl....................................................336/120
[51] Int. Cl..............................................H01f 19/00
[58] Field of Search........................336/15, 116, 117, 336/119, 120

[56] References Cited

UNITED STATES PATENTS 2,432,982 12/1947 Braddon et al. ................336/120 X
3,519,969 7/1970 Hoffman ............................336/120
3,470,459 9/1969 Salo....................................336/120 X

*Primary Examiner*—Thomas J. Kozma
*Attorney*—E. F. Wenderoth et al.

[57] ABSTRACT

The disclosed arrangement comprises a rotary transformer including a stator winding connected to an AC source and rotor winding, and a length of cable wound on a drum rotatable along with the rotor winding, and having one end connected to the rotor winding and the other end connected to a power utilization device at a separate position. When a distance between the drum and device changes, the associated driving device is operated to rotate both the rotor winding and drum to case the cable to be paid out from or drawn in the drum in accordance with the change in distance between the drum and utilization device.

3 Claims, 2 Drawing Figures

PATENTED APR 10 1973

3,727,162

POWER SUPPLY ARRANGEMENT

BACKGROUND OF THE INVENTION

This invention relates to an electric power supply arrangement for continuously supplying an electric power from a power transmitting side to a power receiving side variable in a distance between both sides without interrupting the power transmission from the transmitting to the receiving side even when the distance between both sides is changing. For example, the transmitting side may be disposed on a ship while the receiving side may be located in a variable position in the sea where the transmitted power is utilized for the desired purpose.

Conventional power supply arrangements of the type referred to have comprised on the transmitting side a drum rotatably mounted on a rotatable shaft provided with slip ring means, and a length of cable wound on the drum to electrically connect the transmitting side to the receiving side. A stationary voltage transformer has been used to step down an electric power from an electric generator involved to a predetermined voltage, and brush means has been operatively associated with the slip ring means to supply the electric power thus reduced in voltage to the receiving side through the brush and slip ring means and the length of cable. With a distance between the transmitting and receiving sides changed, the rotatable shaft and therefore the drum is rotated in either one of the opposite directions as the case may be by a driving device directly connected to the shaft through a coupling secured to the latter thereby to pay out or draw the cable from or into the drum until that longitudinal dimension of cable extending from the drum to the utilization device is adjusted to the varied distance therebetween.

It is readily apparent that the provision of the brush and slip ring means can cause serious failures. Also the conventional arrangements have been much disadvantageous from the stand point of both inspection and the maintenance such as the renewal of the worn brush or brushes. Particularly the inspection and maintenance has consumed long time and great labor in bad surroundings, for example, on the sea.

Also there have been previously known power supply arrangements of the type referred to including a length of cable wound on the drum and directly connected at one end to the stationary voltage transformer without the slip ring and brush means as above described interposed therebetween. In that event the cable could be twisted in response to the rotational movement of the drum resulting in a decrease in the useful life of the cable.

SUMMARY OF THE INVENTION

Accordingly it is an object of the invention to provide a new and improved electric power supply arrangement easy in both maintenance and inspection and high in reliability by eliminating the necessity of using slip ring and brush means while avoiding a fear that a length of cable wound on a drum involved will decrease in useful life due to its twisting during the rotation of the drum upon adjusting the longitudinal dimension thereof extending from the drum to the power receiving side.

The invention accomplishes this objects by the provision of an electric power supply arrangement for supplying an electric power from a source of electric power to a power utilization area through transformer means and a length of cable wound on drum means rotatable by driving means through a rotatable shaft, the power utilization area being put at a variable distance from the drum means so that the longitudinal dimension of the cable extending between the drum means and the power utilization area is adjustable in response to a change in distance between the drum means and utilization area through the rotational movement of the drum means due to the operation of the driving means, wherein the transformer means is of a rotary type including rotor winding means disposed so as to be rotated along with the rotatable shaft and connected to the length of cable and stator winding means opposing to the rotor winding means and connected to the source and wherein the driving means is operative to rotate simultaneously the rotor winding means and the drum at a common speed in either one of the opposite directions through the shaft.

In a preferred embodiment of the invention, the rotary transformer means may include the rotor winding means mounted on the rotatable shaft and the drum means rotatable along with the rotor winding means is also secured on the rotatable shaft.

DESCRIPTION OF THE DRAWING

The invention will become more readily apparent from the following detailed description taken in conjunction with the accompanying drawing in which.

DESCRIPTION OF THE PREFERRED EMBODIMENT

While the invention will now be described in conjunction with the three phase power supply it is to be understood that it is equally applicable to power suplies having any desired number of the phases.

Figure 1:
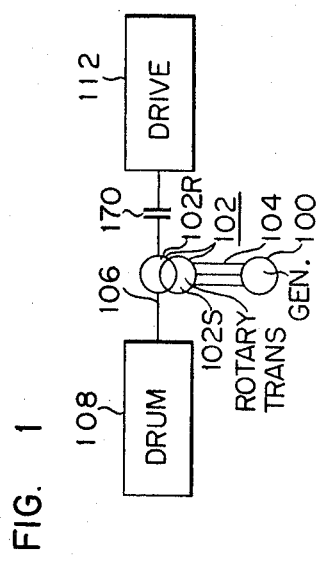
FIG. 1 is a schematic diagram useful in explaining the principles of the invention.

Referring now to FIG. 1 of the drawing it is seen that an arrangement disclosed herein comprises an electric generator 100 and a rotary transformer 102 including a stator winding 102S connected to the generator 100 through three conductors 104 and a rotor winding 102R mounted on a rotatable shaft 106 having one end, in this example, the lefthand end as viewed in FIG. 1 at which a rotatable drum 108 is fixedly secured and the other or righthand end connected to a coupling 110 which is, in turn, connected to a driving device 112. A length of cable is mound on the drum 108 and electrically connected at one end to the rotor winding 102R and at the other end to a power receiving side or a power utilization area put at a variable distance from the drum although the cable, its connections and the power utilizing area are not illustrated in FIG. 1. Thus the electric power from the generator 100 is supplied through stator winding 102S and rotor winding 102R of the rotary transformer 102 and the length of cable to the power utilization area where it is utilized for the desired purpose.

Upon changing a distance between the arrangement of FIG. 1 and the power utilization area, the driving device 112 is operated to rotate the shaft 106 through the coupling 110 to rotate both the drum 108 and the rotor winding 102R at a common speed in either one of the opposite directions. This rotational movement of the drum 108 cause the cable to be payed out from or drawn into the drum 108 as the case may be until the longitudinal dimension of the cable extending between the drum and the power utilization area is adjusted to the now changed distance. At that time, the driving device is stopped. Thus the drum and rotor winding 108 and 102R respectively is rotated at the same speed in a common direction preventing the payed-out or drawn-in cable from twisting.

Figure 2:
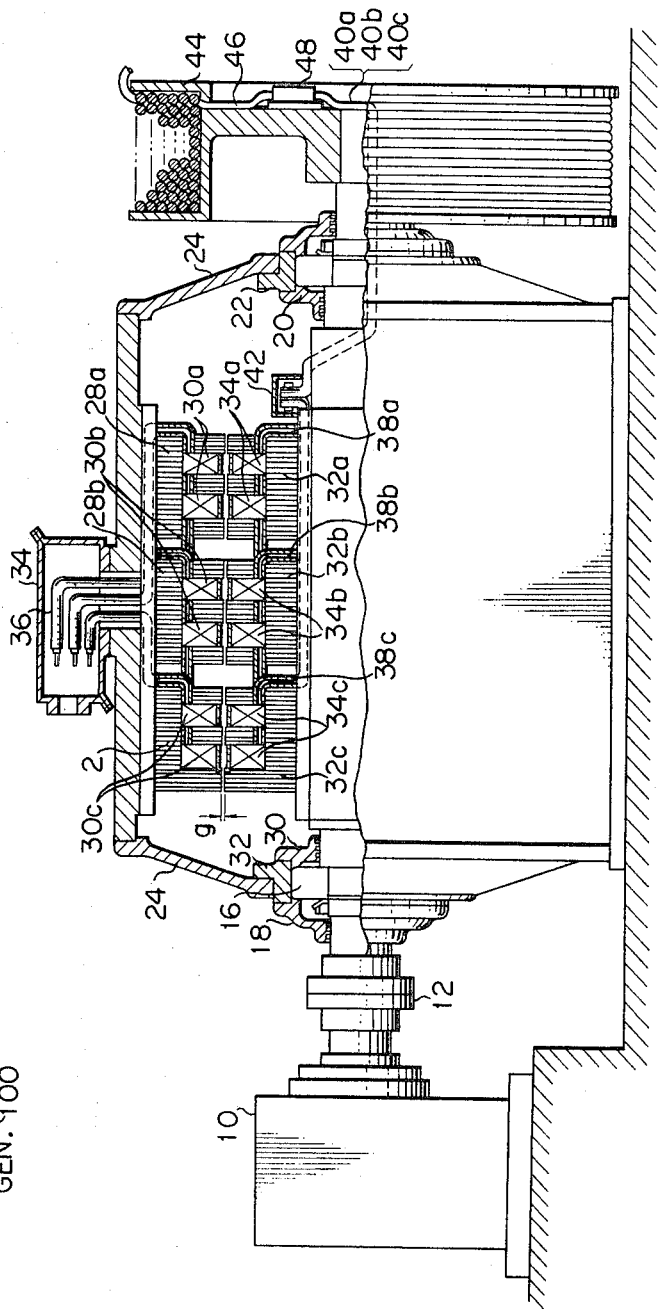
FIG. 2 is a longitudinal sectional view, partly in elevation of the essential part of an electric power supply arrangement constructed in the principles of the invention.

Referring now to FIG. 2, there is illustrated an electric power supply arrangement constructed in accordance with the principles of the invention. It comprises a driving device 10, a coupling 12 operatively connected to the driving device 10 and a rotatable shaft 14 connected to the coupling 12 and rotatably supported to a pair of spaced bearings 16. Each of the bearings 16 is carried by a pair of opposite end covers 18 and 20 and a bearing box 22. The bearing boxes 22 are connected to individual brackets 24 subsequently firmly sandwiching a housing 26 of circular cross section between the free edges thereof. Within a space confined by the housing 26, the brackets 24 and the inner end covers 20 there are three annular iron cores 28a, 28b and 28c rigidly secured in axially spaced aligned relationship to the internal wall surface of the housing 26 by any suitable means and including individual windings 30a, 30b and 30c disposed therein respectively to form a three phase stator unit. Then three annular iron cores 32a, 32b and 32c are rigidly fitted in axially spaced aligned relationship onto the rotatable shaft 14 to oppose to the respective iron cores 28a, 28b and 28c through gaps g. The iron cores 32a, 32b and 32c enclude therein, windings 34a, 34b and 34c opposing to the stator windings 30a, 30b and 30c respectively to form a three phase rotor unit.

A terminal box 34 is shown in FIG. 2 as being secured to the outer wall surface of the housing 26 and having extending thereinto three leads 36a, 36b and 36c connected to the stator windings 30a, 30b and 30c respectively. Those leads are adapted to be connected to the associated leads to a source of three phase electric power (not shown). Each of the rotor windings 34a, 34b or 34c is connected to a separate lead 38a, 38b or 38c and thence to the associated conductor 40a, 40b or 40c on an electrically insulating block 42 mounted on the rotatable shaft 14 within the housing 26.

As shown in FIG. 2 the rotatable shaft 14 includes an extension projecting beyond that end cover 18 remote from the coupling 12 and having the three conductors 40a, 40b and 40c extending therethrough in electrically insulated relationship with one another and the shaft's extension. Rigidly secured on the free end portion of the extension of the rotatable shaft 14 is a drum 44 on which a length of cable 46 is wound. The length of cable includes one end portion electrically connected to the three conductors 40a, 40b and 40c through a connector 48 suitably fixed to the drum 44. The length of cable 46 has the other end connected to a power utilization area located, for example, in the sea although the other end portion of the cable and the power utilization area are not shown in FIG. 2.

The driving device 10 is adapted to rotate the shaft 16 through the coupling 12 and therefore the rotor unit as well as the drum at any desired speed in the either one of the opposite directions whenever it is required to do so.

The arrangement of FIG. 2 is operated as follows: An electric power from a source of electric power (not shown) such as the generator 100 illustrated in FIG. 1 is supplied to the stator windings 30a, 30b and 30c disposed within the respective stator cores 28a, 28b and 28c thereby to induce electric powers across the rotor windings 34a, 34b and 34c. That is, the stator and rotor windings 30 and 34 along with the stator and rotor cores 28 and 32 form a rotary type transformer. The electric powers thus induced across the rotor windings 34a, 34b and 34c are supplied to the length of cable 44 through the leads 38a, 38b and 38c and, conductors 40a, 40b and 40c and the connector 48. Then the three phase power is applied through the length of cable 44 to the power utilization area (not shown).

Assuming that a distance between the power utilization area and the arrangement of FIG. 2 disposed on the associated power transmitting area has changed, the driving device 10 is operated to rotate both the rotor unit 32–38 and the drum 44 through the coupling at a common speed in either one of the opposite directions, as the case may be to cause, the cable 46 to be payed out from or drawn into the drum 44 until the longitudinal dimension of the cable extending between the drum 44 and the utilization area is adjusted to the changed distance whereupon the driving device 10 can be stopped.

The invention has several advantages: For example, the present arrangement is very simple in construction by omitting the slip ring and brush means required to be used in the prior art practice. Also the invention facilitates the maintenance and inspection previously needed to consume long time and great labor. In addition the invention is very high in reliability because the cable is prevented from twisting during the paying-out or drawing-in operations.

While the invention has been illustrated and described in conjunction with a single preferred embodiment thereof, it is to be understood that numerous changes in the details of construction and the arrangement and combination of parts may be restored to without departing from the spirit and scope of the invention. For example, while the stator and rotor windings have been shown in the form of radially wounded windings, the invention is equally appricable to windings such as used in the wound rotor-type induction motor. Also the rotor unit may be disposed on the radially outer portion of the arrangement and the stator unit is disposed on the radially inner portion thereof while the drum 44 or its equivalent may be secured on the outer periphery of the rotor unit.

What we claim is:

1. An electric power supply arrangement for supplying an electric power from a source of electric power to a power utilization area put at a variable distance from the arrangement, comprising, in combination, a source of electric power, driving means, a rotatable shaft driven by said driving means, rotary transformer means including rotor winding means disposed so as to be rotated along with said rotatable shaft and stator winding means opposing to said rotor winding means connected to said source, drum means disposed so as to be rotated along with said rotatable shaft, and a length of cable wounded on said drum means and electrically connected at one end to said rotor winding means and at the other end to the power utilization area so that the longitudinal dimension of the cable extending between the drum means and the power utilization area is adjustable in response to a change in distance between the drum means and the power utilization means through the rotational movement of said drum means, said driving means being operative to rotate simultaneously both said rotor winding means and said drum means at a common speed in either one of the opposite directions.

2. An electric power supply arrangement as claimed in claim 1, wherein said rotary transformer means includes said rotor winding means secured on said rotatable shaft and said drum means rotatable along with said rotor winding means is also secured on said rotatable shaft.

3. An electric power supply arrangement as claimed in claim 1, wherein said rotary transformer means includes a rotor unit on the radially outer portion thereof and a stator unit on radially inner portion thereof and wherein said drum means is disposed on the outer periphery of said rotor unit.

* * * * *